United States Patent [19]
Kennelly

[11] Patent Number: 5,310,963
[45] Date of Patent: May 10, 1994

[54] ELECTRIC CABLE BARRIER GLAND

[75] Inventor: Richard Kennelly, Bolton, England

[73] Assignee: Hawke Cable Glands Limited, England

[21] Appl. No.: 915,544

[22] Filed: Jul. 20, 1992

[30] Foreign Application Priority Data

Jul. 20, 1991 [GB] United Kingdom ............... 9115734.7

[51] Int. Cl.⁵ ..................... H02G 3/02; H02G 15/02
[52] U.S. Cl. .................................. 174/65 SS; 439/606
[58] Field of Search ............... 174/65 R, 65 SS, 65 G, 174/74 R, 77 R; 439/606

[56] References Cited

U.S. PATENT DOCUMENTS 3,555,171  1/1971  Larson ........................... 439/606 X

FOREIGN PATENT DOCUMENTS

| 1204767 | 9/1970 | United Kingdom . |
| 1524684 | 9/1978 | United Kingdom . |
| 1528347 | 10/1978 | United Kingdom . |
| 2074395 | 10/1981 | United Kingdom . |
| 2104311 | 3/1983 | United Kingdom . |
| 2138218 | 10/1984 | United Kingdom . |

*Primary Examiner*—Peter Dungba Vo
*Attorney, Agent, or Firm*—Larson and Taylor

[57] ABSTRACT

An electric cable barrier gland in which hardenable filler compound for surrounding the conductor core of a cable extending through the gland is disposed within a barrier sleeve located in a gland body with any clearance gap therebetween closed by a seal member mounted on a cylindrical sleeve portion of the barrier sleeve between opposed abutment shoulders of the barrier sleeve and gland body.

13 Claims, 3 Drawing Sheets

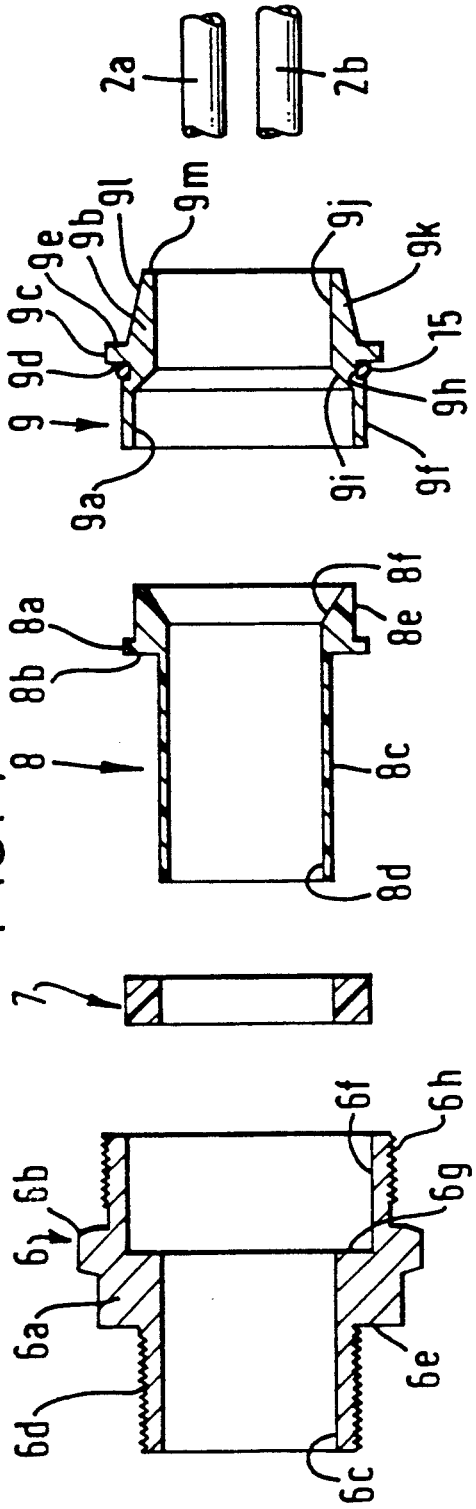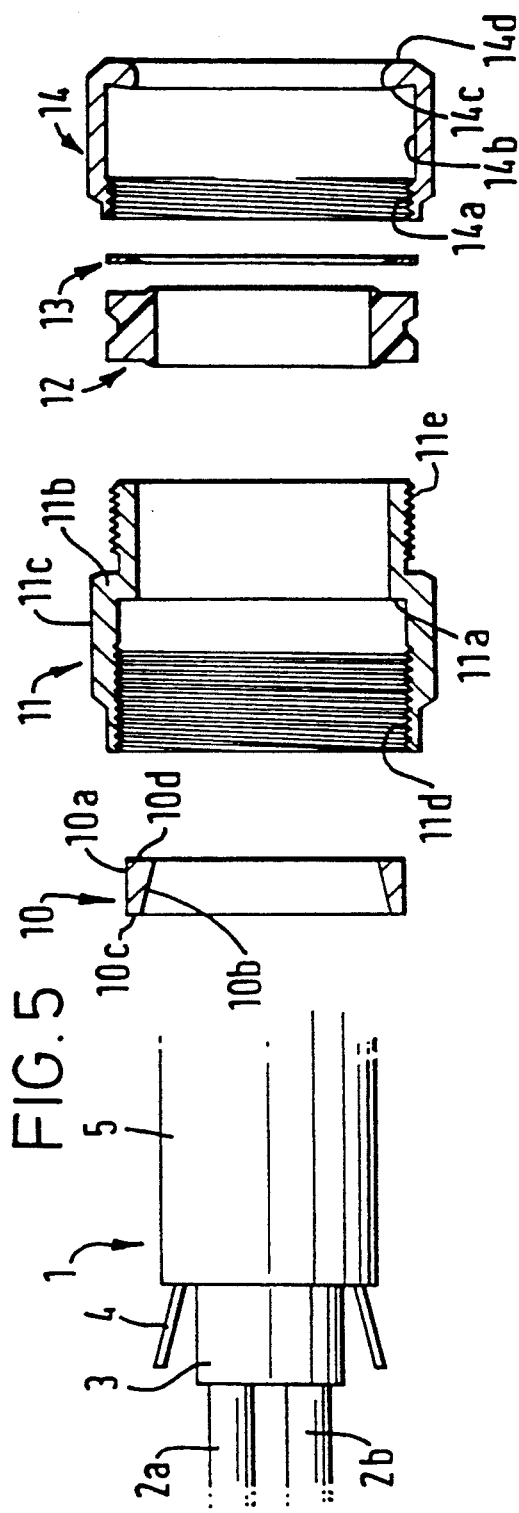

ELECTRIC CABLE BARRIER GLAND

BACKGROUND OF THE INVENTION

This invention concerns an electric cable barrier gland.

This invention has particular application to cable barrier glands of the type that are fitted to an electric cable to provide a barrier to prevent ingress of liquid, gas or solids into the interstices of the cable between the cable cores when the cable sheathing has been removed to enable the connection of the conductive elements of the cable cores to some electrical equipment or installation. Barrier glands of this type are commonly used in hazardous locations and must meet specific flameproof performance criteria to prevent the risk of explosion.

It is already known to provide such a cable barrier gland in which a hardenable compound is used to fill the interstices between the cable cores and this compound is confined within a liner, sleeve or pot through which the cores extend. Such barrier glands with filler compounds and sleeves or pots are known, and two particular arrangements are described in our GB Patents Nos. 2104306 and 2060281.

The manufacture of barrier glands requires accurate and close machining or production as there are prescribed limitations on any gap between unthreaded surfaces in a cable gland. Such gap is commonly referred to as the flame gap and requirements in cable glands are specified in British Standards No. 4683 and No. 5501 of 1971 (Parts 1 and 5) as well as in other Standards issued by regulatory or approval testing authorities.

In our GB Patent No. 2104306 we proposed to overcome certain problems relating to the tolerances required by using a deformable sleeve or lining into which the hardenable material is packed to provide the barrier seal around the cores. The arrangement is such that the deformable sleeve or lining is intended to expand radially on assembly and compression of the gland so that the sleeve or lining is forced into sealing engagement with the complementary unthreaded part of the gland to ensure that there is no flame path. However, in use of the compound material, this presents difficulties in the field because such compound is normally made up from two separate materials which have to be mixed together, one being a resin and the other being a catalyst hardener. The mixture is of a putty-like consistency but ambient temperature variations effect consistency and hardening or curing times, and handling of the materials may be under adverse or extraordinary field conditions.

When a deformable sleeve or lining is used in a gland and subject to filling with a compound, local deformation of the sleeve may arise presenting problems during assembly. In addition, the compound may be spread over the external face of the sleeve or lining during assembly and restrict adequate sealing engagement on completion and compression of the gland.

It is an object of this invention to provide an improved electric cable barrier gland by the construction of which such difficulties can be alleviated in a simple and effective manner.

SUMMARY OF THE INVENTION

According to this invention there is provided an electric cable barrier gland for a cable having a sheath enclosing at least one conductor core, the gland comprising an entry body, a compression body engageable with the entry body, and a sealing member engageable with the compression body and through which the cable with the sheath extends, a substantially rigid barrier sleeve located in the entry body with the cable core extending therethrough, and a hardenable compound disposed in the barrier sleeve filling the sleeve and surrounding the core, the barrier sleeve mounting a seal member engaging with a bore in the entry body in which the barrier sleeve is located, the seal member acting between the barrier sleeve and the entry body to close any clearance fit gap therebetween.

By this feature of the rigid barrier sleeve located in a bore in the entry body with the seal acting therebetween, the potential flame path provided by a clearance fit gap is closed.

Conveniently in known manner, the barrier sleeve may be of brass or other suitable metal. However, the barrier sleeve may be of a selected plastics material providing transparent or translucent portion whereby a visible check on the disposition of the compound can be carried out either during assembly of the gland, or after by disassembly of the completed gland once the compound has hardened. Such visible check will show any discontinuities in the packing of the compound around the core, and any inconsistencies in the mixing of the compound by streaking or non-uniform colouration. The plastics material should be resistant to cracking or melting in the range −20° C. to 90° C. in addition, the plastics material should not be readily combustible. Suitable plastics materials include polycarbonates.

Preferably, the barrier sleeve has a right cylindrical sleeve portion on which the seal is mounted. Conveniently, when the barrier sleeve is made of a plastics material, the cylindrical sleeve portion provides a transparent or translucent tubular wall.

The barrier sleeve may have a shoulder leading to an annular flange remote from the sleeve portion with the seal mounted on the sleeve portion and abutting the shoulder.

By this arrangement of the annular flange of the barrier sleeve, the seal engages both the cylindrical face of the sleeve portion and the shoulder and the bore of the entry body to ensure complete sealing of the barrier sleeve to the entry body when the gland is assembled.

It is also preferred that the entry body has a through bore of smaller diameter than the aforesaid bore and said through bore receives the sleeve portion of the barrier sleeve.

By this arrangement the aforesaid bore is a counterbore at one end of the entry body providing an Internal shoulder with a face for engagement by the seal so that the seal is trapped between the flange of the barrier sleeve and the Internal shoulder of the entry adaptor.

Preferably, the seal is of suitable elastomeric material such as Neoprene, Nitrite or Silicone and which has an operating temperature range of from −20° C. to 90° C.

Preferably, the gland further comprises a hollow ferrule member through which the cable extends with the compound also disposed therewithin.

The ferrule is arranged to be located relative to the barrier sleeve and the entry adaptor by the engagement of the compression body with the entry adaptor.

One end of the ferrule is arranged to engage that face of the barrier sleeve flange which is opposed to the shoulder, and the seal is compressed into sealing engagement when the compression body is engaged with and tightened up on the entry adaptor.

Preferably, the gland further comprises a clamping ring arranged to seat over a complementary shaped face on that end of the ferrule remote from the barrier sleeve with an armour or earth element of the cable sheath clamped therebetween by the engagement of the compression body with the entry adaptor.

The sealing member of the gland comprises a seal nut mounting a cable seal engaging the external face of the cable sheath with the seal nut in threaded engagement with the compression body.

By this arrangement of the various parts of the barrier gland, the barrier sleeve and the ferrule extend coaxially and the core with the compound therearound are enclosed thereby so that on assembly of the gland with the compound mixture in place prior to hardening, the tightening of the compression body on the end adaptor applies pressure to the compound mixture confined around the core and compresses the seal on the barrier sleeve to close any clearance gap between the assembled non-threaded part of the entry adaptor, the barrier sleeve and ferrule.

Other particular features of the invented barrier gland will be explained later herein with reference to an exemplary embodiment showing a simple arrangement with a cable having two conductor cores.

As will be appreciated, cables may be of different types with various kinds of sheath and numbers of conductor cores and, in some cases with separate earthing conductors. Furthermore, dependent on the type of electrical equipment for which the barrier gland is to be connected and used, various designs or styles of entry adaptor may be required.

This invention provides a simple construction ensuring a complete peripheral seal between the barrier sleeve and the entry adaptor to preclude the possibility of a flame gap whilst accommodating manufacturing or production clearance tolerances.

An exemplary embodiment of a cable barrier gland according to this invention will now be described with reference to the accompanying drawings.

BRIEF DESCRIPTION OF THE DRAWINGS

FIG. 4 is an exploded sectional view of the component parts for the gland entry side of the gland; and FIG. 5 is an exploded sectional view of the component parts for the cable seal and compression side of the gland.

DETAILED DESCRIPTION OF THE EXEMPLARY EMBODIMENT

Figure 1:
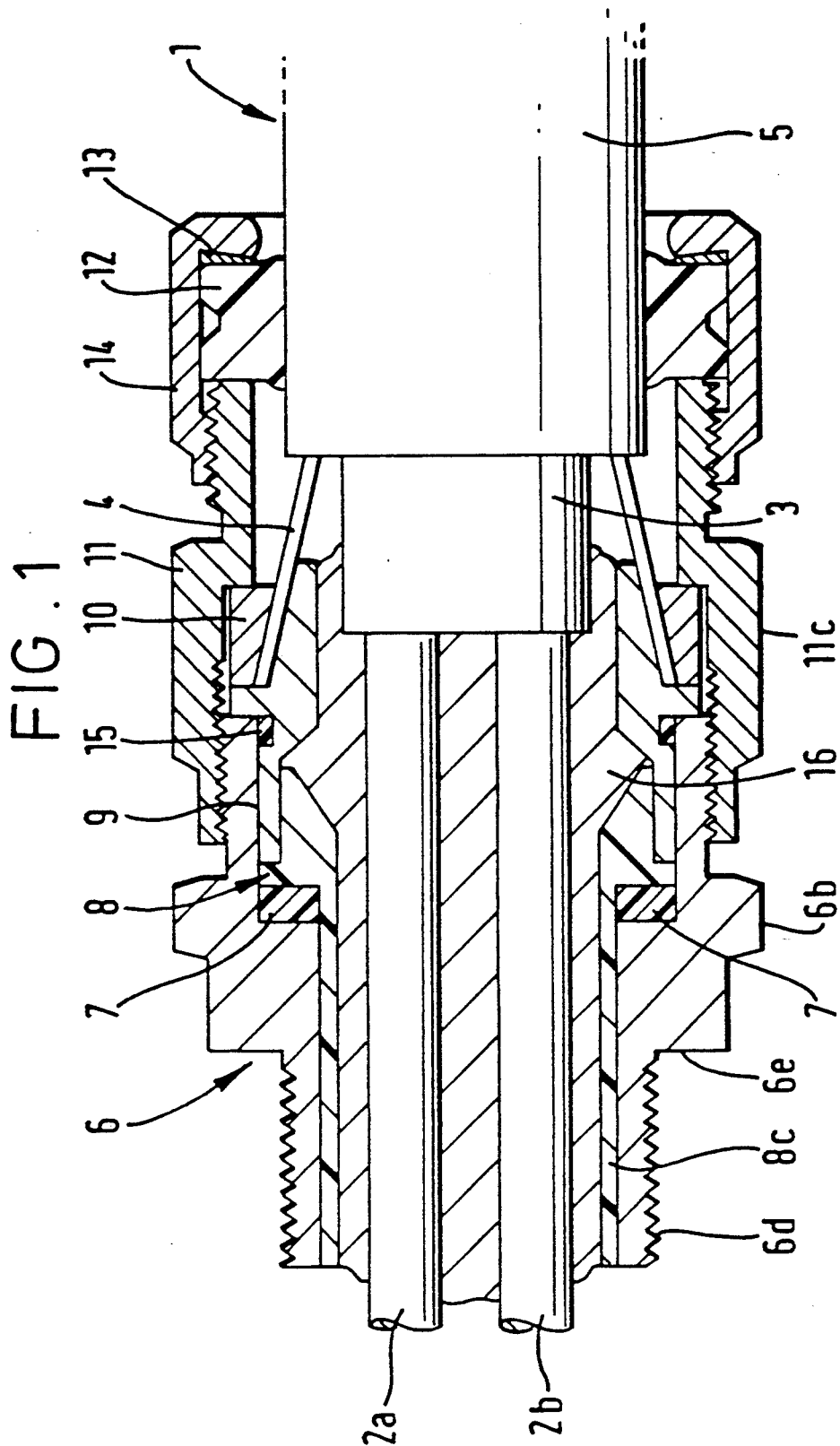
FIG. 1 is a longitudinal section through an assembled "made-off" barrier gland in which the compound is in situ.

With reference to the accompanying drawings, in this exemplary embodiment, the electric cable 1 comprises two conductor cores 2a,2b surrounded by an inner sheath 3 and, in known manner packing or filling material would separate the cores 2a,2b within the inner sheath 3. An armour or earthing element 4 extends between the inner sheath 3 and an outer sheath 5. As will be appreciated by those familiar with this field, there are various types and sizes of cable with different numbers of cores, and the cable 1 is only one type to which this invention has application.

As shown in FIG. 4, on the entry side of the gland the component parts comprise an entry adaptor 6, a barrier seal 7, a barrier sleeve 8 and a ferrule 9 which are for assembly on the entry side of electrical equipment (not shown). On the cable seal and compression side, the component parts as shown in FIG. 5 comprise a clamping ring 10, a compression nut 11, a cable seal 12 with washer 13 and a seal nut 14 in the form of an end cap. All of these parts are arranged and adapted to be coaxially assembled around the cable 1 to provide the completed "made-off" barrier gland as depicted in FIG. 1 and as will be described later herein.

The entry adaptor 6 has an annular body portion 6a formed with a flatted flange 6b for engagement by a spanner or like tool to rotate the adaptor One end of the adaptor 6 has a cylindrical bore 6c and an external male thread 6d terminating in a shoulder 6e. This one end of the adaptor 6 is for threaded engagement with a complementary threaded bore or bushing (not shown) in the electrical equipment in known manner. The other end of the adaptor 6 has a coaxial counterbore 6f terminating in an internal shoulder 6g with this end having an external thread 6h.

The barrier seal 7 is of annular form sized to fit on the barrier sleeve 8 and is of suitable elastomeric or resilient material such as Neoprene or Silicone. The outer diameter of the seal 7 is complementary to the counterbore 6f and in the assembled gland the seal 7 is arranged to seat against the shoulder 6g.

In this exemplary embodiment, the barrier sleeve 8 is made of a strong plastics rigid material such as clear polycarbonate. The sleeve 8 may be machined from a rod of plastics material or it can be a moulding. The barrier sleeve 8 has an annular flange 8a extending from a shoulder 8b. A sleeve portion 8c of relatively thin wall thickness extends from the shoulder 8b with the outer diameter being a sliding fit in the bore 6c of the entry adaptor 6. The seal 7 fits over the sleeve portion 8c and in the assembled gland (FIG. 1) the seal 7 is seated between the shoulders 6g and 8b. The plastics material is selected so that the thin wall of the sleeve portion 8c is transparent or translucent so that the user on assembly or an inspector can view the compound material 16 or cores 2a,2b located within the bore 8d of the barrier sleeve 8.

The end of the barrier sleeve 8 opposed to the sleeve portion 8c is larger than the sleeve portion 8c and provides a cylindrical outer face 8e of diameter complementary to an inner bore 9a of the ferrule 9. This end of the barrier sleeve 8 has a frusto-conical shaped entry bore 8f tapering into the sleeve bore 8d.

The ferrule 9 has a body 8b from which extends an annular flange 9c providing opposed radial abutment faces 9d and 9e. The ferrule 9 has a tubular portion 9f extending from the flange 9c and adjacent to the flange 9c there is an external annular recess 9h seating an O-ring seal 15. The outer diameter of the portion 9f is complementary to the bore 6f of the adaptor 6 so that in the assembled gland (FIG. 1) the tubular portion 9f is received and engaged between one end of the adaptor 6 and one end of the barrier sleeve 8.

The cylindrical bore 9a of the ferrule 9 leads to a tapered portion 9i leading to a smaller cylindrical entry bore 9j to which, in use the cable 1 is presented. The entry bore 9j is in an entry portion 9k extending from the flange 9c with the portion 9k having an external clamp face 9l which is of frustoconical shape tapering from the flange 9c to the end face 9m of ferrule.

With reference now to FIG. 5, there is shown the clamping ring 10 which has a cylindrical outer face 10a and a tapering inner clamp face 10b complementary to the clamp face 9l of the ferrule 9. The clamping ring 10 has opposed abutment faces 10c and 10d arranged for respective engagement in the assembled gland with end face 9m of the ferrule 9 and an internal shoulder 11a of the compression nut 11.

The compression nut 11 has a body 11b formed with flats 11c for engagement by a spanner or the like. One end of the nut 11 has an internal thread 11d for threaded engagement with the thread 6h of the adaptor 6, and the other end of the nut 11 has an external thread 11e for engagement with the internal thread 14a of the end cap nut 14.

The cable seal 12 with the washer 13 are arranged to be seated in an annular recess 14b within the end cap nut 14. The washer 13 abuts against the inner face 14c of an inward lip 14d at one end of the end cap nut 14 through which the cable 1 is first entered in use during assembly of the gland.

Figure 2:
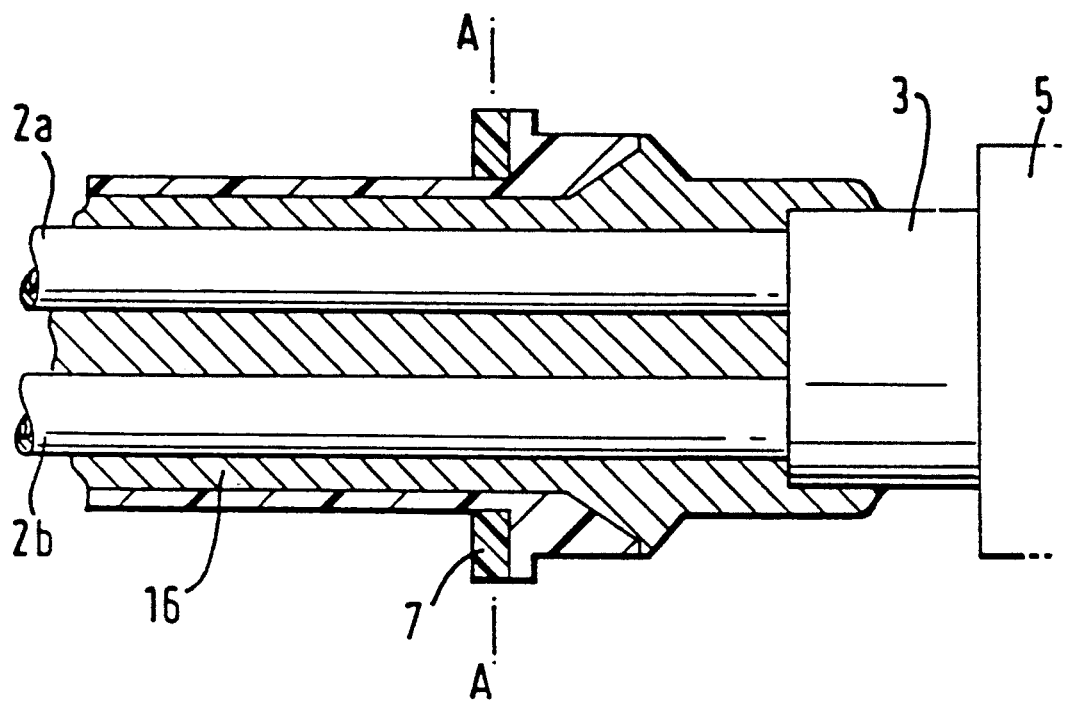
FIG. 2 is a section similar to that of FIG. 1 with certain parts omitted for clarity.
Figure 3:
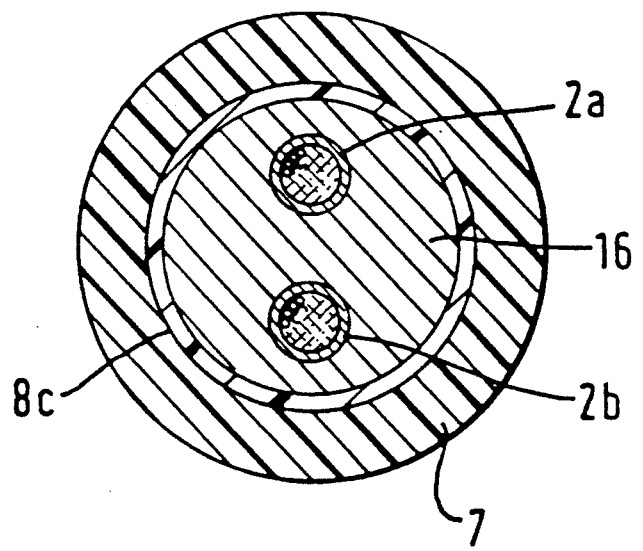
FIG. 3 is a cross-sectional view in the plane A—A of FIG. 2.

In addition to the component parts of the gland as just described, there is the hardenable compound which is provided by two materials to be mixed together. Usually the materials are an epoxy resin and a hardener, and these have to be carefully mixed together by hand in a quantity sufficient to fill the space within the gland to form a barrier. The compound barrier 16 is shown in FIGS. 1, 2 and 3 of the drawings.

The assembly and use of the invented barrier gland will now be described.

In order to connect the cable 1 to the electrical equipment, the cable 1 is laid out and allowing for the required lengths of cores 2a,2b these are exposed cutting back the outer sheath 5, exposing the armour or earthing element 4 and then cutting back the inner sheath 3 so that it projects beyond the outer sheath 5.

The end cap nut 14 with seal 12 and washer 13 assembled therein together with the compression nut 11 loosely threaded thereto are slid over the cable 1 to fit on the outer sheath and clear of the inner sheath 3 and cores 2a,2b. The clamping ring 10 is located over the exposed armour or earth element 4 which is spread outwardly and trimmed back. At this stage the ferrule 9 may be brought into place temporarily to assist in correctly locating and trimming the element 4 as spread around the face 9l but trimmed so as to clear the abutment face 9e and not extending beyond the abutment face 10c of the clamping ring.

The cores 2a, 2b are spread apart and the mixed two part compound material which has a consistency of putty or plasticine is applied into the crutch between the cores 2a,2b. The cores 2a,2b are then brought back towards each other and the compound material is packed carefully around the cores 2a,2b to avoid any voids and moulded into a sausage like shape. Once this has been done and within the time limit before the compound material starts to harden, the barrier sleeve 8 with seal 7 is presented with the entry bore 8f facing the free ends of the cores 2a,2b and is pushed over the cores 2a,2b with the compound packed therearound.

After cleaning away any excess compound exuding onto the external face of the barrier sleeve 8 and the seal 7, the free ends of the cores 2a, 2b are passed through the entry adaptor 6 which has been screwed into the electrical equipment (not shown). The sleeve portion 8c of the barrier sleeve 8 is slid into the entry adaptor 6 to engage within the complementary bore 6c thereof with the seal 7 being between the shoulder 6g and the sleeve shoulder 8b. The end of the sleeve 8 having the entry bore 8f is pushed into engagement within the tubular portion 9f of the ferrule 9 with the sleeve 8 sitting within the internal bore 9a whilst the portion 9f is received within the internal bore 6f of the entry adaptor 6.

Once the parts are so loosely assembled and located, the compression nut 11 with the clamping ring 10 is then screwed into engagement with the thread 6h of the entry adaptor 6. On initial tightening of the compression nut 11, the parts are brought together axially so that the flange 8a of the barrier sleeve 8 abuts the end face of the ferrule portion 9f and the seal 7 is compressed. As the seal 7 is compressed, due to the axial forces applied, it is brought into face engagement between the unthreaded portions of the end adaptor and the barrier sleeve and completely seals these two parts together to act as a barrier between the two parts and closing any gap existing between the sleeve portion and the bore 6c of the entry adaptor.

After this initial assembly, the abutment face 9d of the ferrule engages the end face of the entry adaptor 6 with the O-ring seal 15 in sealing engagement between the ferrule 9 and the internal bore 6f of the entry adaptor 6.

As the compression nut 11 is tightened up the mastic compound material is subjected to pressure with a squeezing action so that it is compressed around the cores 2a,2b. Any excess compound exudes axially to extend along the cores 2a,2b and cover the exposed inner sheath 3 to provide the barrier of compound 16 within the gland. This squeezing action and the exudation of the compound material is not visible to the assembler, and the assembled gland has to be left in this condition for the required period specified for hardening of the compound.

After the compound has hardened, the integrity of the barrier 16 formed around the cores 2a,2b by the compound can be checked or verified by unscrewing the compression nut 11 and pulling the assembly with the barrier sleeve 8 away from the entry adaptor 6. Once the barrier sleeve 8 is clear of the entry adaptor 6, the disposition and condition of the compound 16 is visible through the translucent sleeve portion 8c and any voids or discontinuities or discrepancies in the compound barrier can be seen. By such visible inspection, an important safeguard check can be made avoiding destructive testing.

Conveniently, the visible check can be done if required before the final connection to the electrical equipment. After such check, the assembly is completed by bringing the cable seal 12 and the seal nut 14 into threaded engagement with the external thread 11e of the compression nut 11.

Alternatively, for on-site inspection of an installation, the visible check can be carried out by partial disassembly of the gland thereby avoiding expensive destructive checks.

In the foregoing exemplary embodiment, the barrier sleeve is of plastics to give the visibility advantage of the transparent or translucent portion mentioned. However, this is not essential and the barrier sleeve may be of metal such as brass and the advantages in using the seal mounted on the barrier sleeve are obtained.

As will be appreciated, various modifications to the arrangement and type of compression nut and/or cable seal member with end cap nut and/or armour clamping ring and/or earthing connection are envisaged and within the scope of this invention. In addition, the shape and axial length of barrier sleeve may be adapted to suit various types of entry adaptor. Furthermore, the O-ring seal mounted on the ferrule and engaging the entry adaptor may be omitted as the primary seal is that mounted on the barrier sleeve. Other types of cable seal may be used to suit the king of cable and installation requirements.

I claim:

1. An electric cable barrier gland for a cable having a sheath enclosing at least one conductor core, the gland comprising an entry body defining an entry bore with a counterbore at one end providing an internal shoulder, a substantially rigid barrier sleeve through which the cable core extends located in said entry body and defining therewith a clearance fit gap, a hardenable compound disposable in said barrier sleeve to fill said barrier sleeve and surround the cable core, said barrier sleeve having a nose portion with an annular flange received in said counterbore and a sleeve portion of reduced outer diameter received in said entry bore, said flange providing an external shoulder and a side shoulder, said external shoulder being opposite said internal shoulder of said counterbore, an annular seal positioned between said internal and external shoulders on said sleeve portion, a ferrule surrounding said nose portion and abutting said flange on said side shoulder remote from said seal, and a compression body for urging said ferrule axially towards said counterbore of said entry body to compress said seal to close said clearance fit gap between said entry body and said barrier sleeve.

2. The gland according to claim 1 wherein said barrier sleeve is made of metal.

3. The gland according to claim 1 further comprising a ferrule seal positioned on said ferrule to seal said ferrule within said counterbore.

4. The gland according to claim 1 further comprising a clamping ring arranged to seat over a complementary shaped face on that end of said ferrule remote from said barrier sleeve for clamping an armor or grounding element of the cable therebetween, said clamping ring and ferrule being urged axially to clamp the cable armor or grounding element by engagement of said compression body with said entry body.

5. The gland according to claim 1 further comprising a cap nut engageable with that end of said compression body remote from said entry body and through which the cable extends, said cap nut mounting a cable seal engageable with the cable sheath.

6. The gland according to claim 1 wherein said barrier sleeve is made of plastics material.

7. The gland according to claim 6 wherein said barrier sleeve has a transparent or translucent portion.

8. The gland according to claim 6 wherein the plastics material of said barrier sleeve is resistant to cracking or melting in the range from −20° C. to 90° C.

9. The gland according to claim 6 wherein the plastics material of said barrier sleeve is fire resistant.

10. The gland according to claim 6 wherein said barrier sleeve is made of polycarbonate.

11. The gland according to claim 1 wherein said seal is made of elastomeric material.

12. The gland according to claim 11 wherein the elastomeric material of said seal is selected from the group comprising neoprene, nitrile and silicone rubber.

13. The gland according to claim 11 wherein the elastomeric material of said seal has an operating temperature range of from −20° C. to 90° C.

* * * * *